US009155285B2

(12) United States Patent
Li

(10) Patent No.: US 9,155,285 B2
(45) Date of Patent: Oct. 13, 2015

(54) PORTABLE WATER FEEDER FOR PETS

(75) Inventor: Liedang Li, Shenzhen (CN)

(73) Assignee: Shenzhen Xingrisheng Industrial Co., Ltd., Shenzhen (CN)

( * ) Notice: Subject to any disclaimer, the term of this patent is extended or adjusted under 35 U.S.C. 154(b) by 5 days.

(21) Appl. No.: 14/240,865

(22) PCT Filed: Sep. 8, 2011

(86) PCT No.: PCT/CN2011/079479
§ 371 (c)(1),
(2), (4) Date: Feb. 25, 2014

(87) PCT Pub. No.: WO2013/033905
PCT Pub. Date: Mar. 14, 2013

(65) Prior Publication Data
US 2014/0209032 A1   Jul. 31, 2014

(51) Int. Cl.
*A01K 7/00*   (2006.01)
(52) U.S. Cl.
CPC ........................................ *A01K 7/00* (2013.01)
(58) Field of Classification Search
CPC ................................ A01K 7/00; A01K 7/005
USPC .............................................. 119/52.1, 72, 74
See application file for complete search history.

(56) References Cited

U.S. PATENT DOCUMENTS

| | | | | |
|---|---|---|---|---|
| 5,140,945 A * | 8/1992 | Barnhart et al. | ............. | 119/52.2 |
| 5,636,592 A * | 6/1997 | Wechsler | ...................... | 119/52.1 |
| 5,738,039 A * | 4/1998 | Berman et al. | .................. | 119/77 |
| 5,960,742 A * | 10/1999 | O'Rourke et al. | ............... | 119/74 |
| 6,390,022 B1 | 5/2002 | Eichler et al. | | |
| 6,971,331 B1 * | 12/2005 | Rohrer | ............................ | 119/77 |
| 7,287,487 B2 * | 10/2007 | Hurwitz | .......................... | 119/74 |
| 7,690,329 B2 * | 4/2010 | Parks | ............................... | 119/74 |
| 2007/0017450 A1 | 1/2007 | Hurwitz | | |
| 2007/0079762 A1 * | 4/2007 | Stephanos | ....................... | 119/74 |
| 2008/0087224 A1 * | 4/2008 | Wechsler | ..................... | 119/52.1 |

FOREIGN PATENT DOCUMENTS

| | | |
|---|---|---|
| CN | 2507248 Y | 8/2002 |
| CN | 2788548 Y | 6/2006 |
| CN | 201541566 U | 8/2010 |

OTHER PUBLICATIONS

Copy of International Search Report for PCT Application No. PCT/CN2011/079479, dated Jun. 14, 2012, 4 pages.

\* cited by examiner

*Primary Examiner* — Rob Swiatek
*Assistant Examiner* — Morgan T Barlow
(74) *Attorney, Agent, or Firm* — Westman, Champlin & Koehler, P.A.

(57) ABSTRACT

A portable water feeder for pets comprises a water storage bottle, a water tray for pets, a bottle stopper and curved sliding surface set on the inner bottom side of the water tray; the bottle stopper has a radial water outlet; when the water storage bottle is in the closing state, the head of the bottle stopper presses against the root of the curved sliding surface, so that water cannot leak from the water storage bottle; when the water storage bottle is rotated to be in use and squeezed, the bottle stopper moves a distance towards the outside of the bottle mouth, so that the water flow path between the water storage bottle and the water tray is clear and water flows from the water storage bottle into the water tray for pets to drink. The water feeder is watertight and simple in structure.

7 Claims, 5 Drawing Sheets

PORTABLE WATER FEEDER FOR PETS

CROSS-REFERENCE TO RELATED APPLICATION

This Application is a Section 371 National Stage Application of International Application No. PCT/CN2011/079479, filed Sep. 8, 2011 and published as WO2013/033905A1 on Mar. 14, 2013, not in English, the contents of which are hereby incorporated by reference in their entirety.

TECHNICAL FIELD

The present invention relates to water dispenser for livestock or hunted animals, in particular, it involves a portable water feeder for pets available as drinking fountain of pets.

BACKGROUND ART

One portable water feeder for pets with prior art requires that water will be poured into the water tray after the water storage bottle stopper is manually opened, which is inconvenient for operation and easy to dampen hands; In another portable water feeder for pets, the water nozzle of its water storage bottle is made from silica gel materials, on the water nozzle is set with outlet holes and inside the water tray is equipped with squeezing water nozzles, thus enabling the water outlets thereon to distort and the plastic bulging structure swell up. When it is used for a long time, the silica gel water nozzle will constantly friction with the plastic bulging structure, easily causing the silica gel water nozzle to suffer wear and tear. Therefore, it is easy for the water feeder to be subject to leakage. Furthermore, when the water storage bottle closes inside the water tray, the outlet holes on its silica gel outlet nozzle are not sealed, which will also easily incur leakage.

CONTENT OF THE INVENTION

The technical problem that the present invention aims to settle lies in the avoidance of shortcomings of the above-mentioned prior art and the supply of a portable water feeder for pets where the sealing or clearness for water flow channel between the water storage bottle and water tray can automatically be achieved by means of the bottle stopper's moving inwards and outwards. During the journey, this water feeder is watertight and simple in structure as well as easy for operation and has reduced cost.

The technical solution adopted by the present invention to resolve the said technical problem is that: a portable water feeder for pets comprising a water storage bottle and water tray for pets which are rotatably connected mutually by shaft hole and pivot, in particular, it also comprises a stopper and curved sliding surface set on the inner base of the said water tray, the main body of the said bottle stopper has the hollow cylindrical shape whose middle section is set with radial outlet holes, the main body of the bottle stopper is inserted into the water storage bottle mouth, which shares the central axis with the water storage bottle;

when the said water storage bottle is in the closing state, the head of the bottle stopper will press against the root of the said curved sliding surface, the whole body of the water storage bottle is stuffed into the said water tray, the body of the said bottle stopper is pressed into the water storage bottle mouth, so that the water flow path between the said water storage bottle and water tray can be sealed and water cannot leak from the water storage bottle;

the water storage bottle is rotated round the said pivot on the vertical surface perpendicular to such pivot, the head of the bottle stopper slides from the root of the said curved sliding surface downwards to the oblique surface at the near end, when the said water storage bottle is rotated until perpendicular to the base of the said water tray, the body of the said bottle stopper is still inside the water storage bottle mouth; the water storage bottle is continued to rotate in the original direction until it is in use, its central axis and the base of the said water tray intersect at the obtuse angle of δ; and under the pressure arising from the water storage bottle squeezed, the water stopper will moves a distance along its own axis towards the outside of the said bottle mouth, so that the water flow path between the said water storage bottle and water tray can be clear and water flows from the said water storage bottle can flow into the said water tray for pets to drink; when the water storage bottle is ceased to be squeezed, water will stop flowing into the said water tray; after pets finish drinking water in turn, the water storage bottle shall be rotated in the opposite direction to enable it to return to the said closing state.

The said bottle stopper comprises the hollow curved ring-shaped vertical surface and head with its arc slightly protruding from the outer surface, the said vertical surface includes the coaxial upper and lower sections with different diameters; the lower section is close to the said head and has a larger diameter than that of the upper section, thus forming the first step diameter on such vertical surface; one side of the said bottle stopper whereon is set up a frame-shaped concave area acrossing the upper and lower sections of the said vertical surface, is located at the concave area of the lower section for the said vertical surface and stretches upwards from the lower section for such vertical surface, and meanwhile, the protruding surface for the narrow strip is formed, over which is set with the water outlet of the bottle stopper.

It also comprises a connecting piece which are hollow casing ones, the inner ring surface at its front end is set up a second step diameter corresponding to the first step diameter at the vertical surface of the said bottle stopper, the inner ring surface at its rear end is set with the inner screw thread adapted to the outer screw thread of the said water storage bottle mouth;

the gap connected with the said water outlet is formed between the surface of the concave area at the vertical surface of the said bottle stopper and the inner ring surface at the front end of the said connecting pieces, thus forming the said water flow path; the first step diameter at the vertical surface of the said bottle stopper detached from or mated with the second step diameter at the inner wall for the front ends of the said connecting piece, correspondingly, the said water flow path is clear or sealed.

The said bottle stopper and connecting piece are made from engineering plastics difficult of the wear and tear.

When the said water storage bottle is in use, its central axis and the base of the said water tray intersect at the obtuse angle δ, and 135°>δ>100°.

At the part linking the vertical surface of the said bottle stopper and its head is set with the ring-shaped concave slot surrounding the said vertical surface, a sealing circle is inlaid into such concave slot, which are used for further sealing the said water flow path.

At the inner base of the said water tray is set with the bulging structure of the said curved sliding surface, such bulging structure is set at one end of the said water tray and connects the inner base and one tip end of the said water tray;

the said curved sliding surface is formed by its stretching downwards from the top of such tip end to the inner base of the said water tray.

On the said connecting piece are set with pivot, correspondingly, the said water tray is set with shaft holes, the said water storage bottle is rotated from the closing state to the using state through the joining of the pivot and shaft hole.

The said water tray partially surrounds the said water storage bottle.

Compared with prior art, the advantageous effects of the present invention's water feeder lie that:

1. Water can flow from the water storage bottle into the water tray without need for manually opening the water storage bottle stopper;

2. The water storage bottle stopper and its joined connecting pieces are made from engineering plastic materials difficult of the wear and tear;

3. It has good leak tightness and no water will leak when it is carried.

MODE OF CARRYING OUT THE INVENTION MODEL

Figure 1:
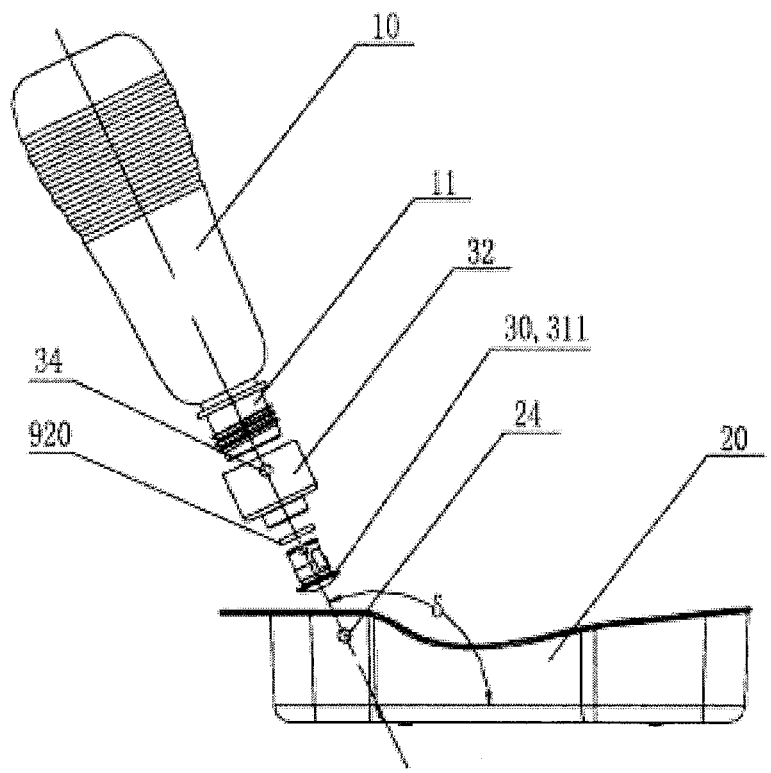
FIG. 1 is the illustrative diagram on the overall structure of the present invention Portable Water Feeder for Pets in a decomposed state.
Figure 2:
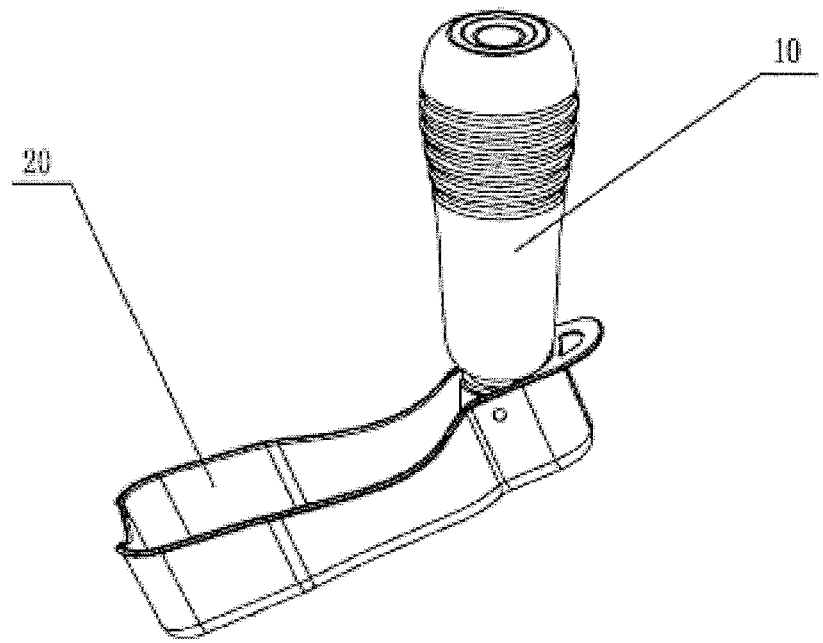
FIG. 2 is the axonometric projection illustrative diagram of the assembly from the various components as illustrated in FIG. 1.

The present invention will further be expatiated on by the aid of various attached drawings.

As illustrated in FIG. 1-3, FIG. 5-8 and FIG. 10-12, a portable feeder for pets comprises a water storage bottle 10 and water tray for pets 20 which are rotabably connected mutually by shaft hole and pivot 24, 34, it also comprises a stopper 30 and curved sliding surface 21 set on the inner base of the said water tray 20, the main body of the said bottle stopper 30 has the hollow cylindrical shape whose middle section is set with radial outlet holes 710, the main body of the bottle stopper 30 is inserted into the water storage bottle mouth 11, which shares the central axis with the water storage bottle 10;

when the said water storage bottle 10 is in the closing state, the head 311 of the bottle stopper 30 will press against the root of the said curved sliding surface 21, the whole body of the water storage bottle 10 is stuffed into the said water tray 20, the body of the said bottle stopper 30 is pressed into the water storage bottle mouth 11, so that the water flow path between the said water storage bottle 10 and water tray 20 can be sealed and water cannot leak from the water storage bottle 10;

the water storage bottle 10 is rotated round the said pivot 34 on the vertical surface perpendicular to such pivot 34, the head 311 of the bottle stopper slides from the root of the said curved sliding surface 21 downwards to the oblique surface at the near end, when the said water storage bottle 10 is rotated until perpendicular to the base of the said water tray 20, the body of the said bottle stopper 30 is still inside the water storage bottle mouth 11; the water storage bottle 10 is continued to rotate in the original direction until it is in use, its central axis and the base of the said water tray 20 intersect at the obtuse angle of δ; and under the pressure arising from the water storage bottle 10 squeezed, the water stopper 30 will moves a distance along its own axis towards the outside of the said bottle mouth 11, so that the water flow path between the said water storage bottle 10 and water tray 20 can be clear and water flows from the said water storage bottle 10 can flow into the said water tray 20 for pets to drink; when the water storage bottle 10 is ceased to be squeezed, water will stop flowing into the said water tray 20; after pets finish drinking water in turn, the water storage bottle 10 shall be rotated in the opposite direction to enable it to return to the said closing state.

Figure 4:
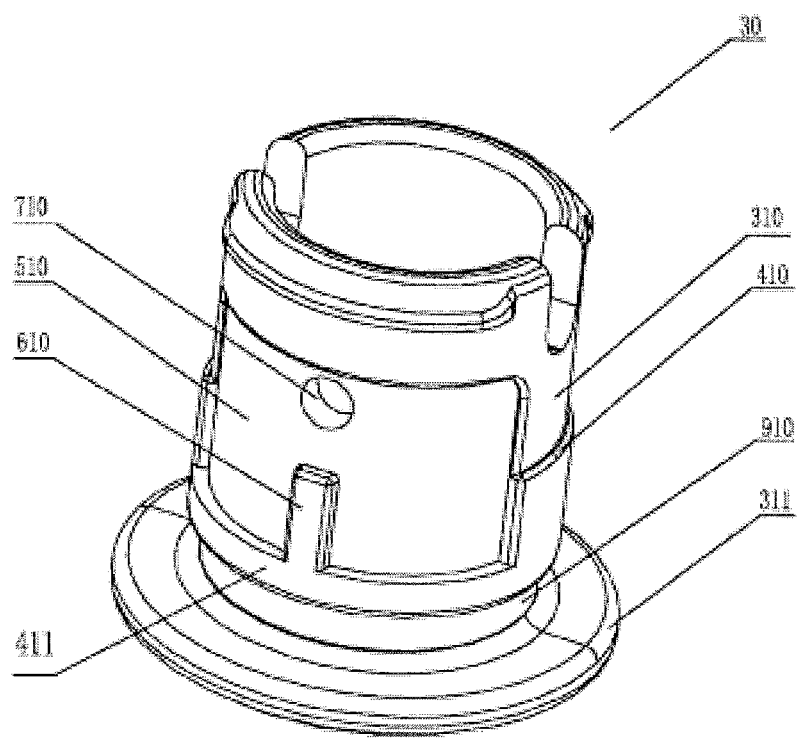
FIG. 4 is axonometric projection illustrative diagram on the overall appearance of the bottle stopper 30 as illustrated in FIG. 1.

As illustrated in FIG. 4, the said bottle stopper 30 comprises the hollow curved ring-shaped vertical surface 310 and head 311 with its arc slightly protruding from the outer surface, the said vertical surface 310 includes the coaxial upper and lower sections with different diameters; the lower section is close to the said head 311 and has a larger diameter than that of the upper section, thus forming the first step diameter 410 on such vertical surface 310; one side of the said bottle stopper 30 whereon is set up a frame-shaped concave area 510 acrossing the upper and lower sections of the said vertical surface 310, is located at the concave area 510 of the lower section for the said vertical surface 310 and stretches upwards from the lower section for such vertical surface 310, and meanwhile, the protruding surface for the narrow strip 610 is formed, over which is set with the water outlet 710 of the bottle stopper.

Figure 9:
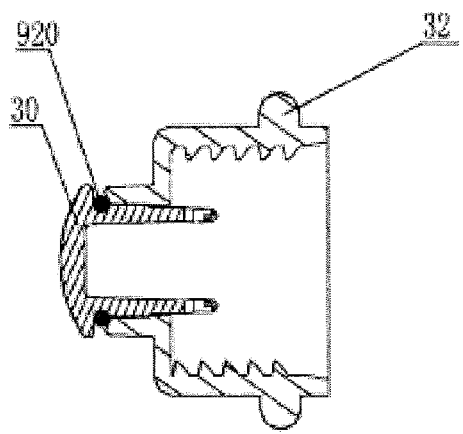
FIG. 9 is the sectional view on the case where the said bottle stopper 30 is sealed and connected with the connecting pieces 32.
Figure 13:
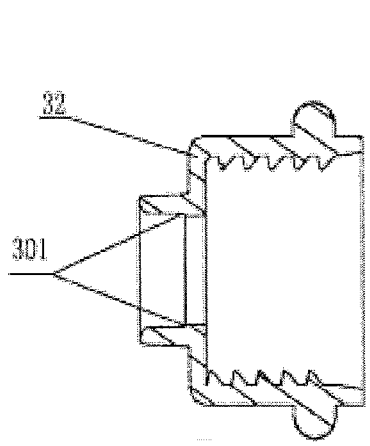
FIG. 13 is the sectional view on the said connecting piece 32.
Figure 6:
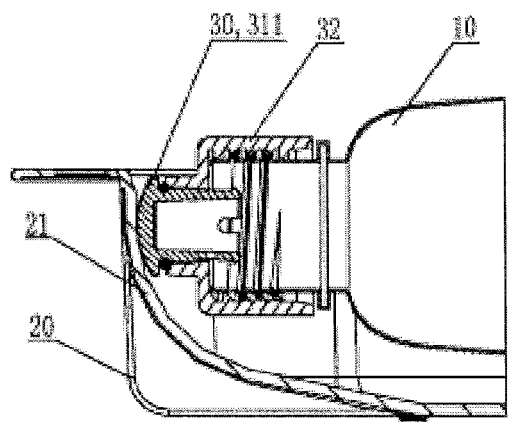
FIG. 6 is the partially sectional view for the water storage bottle 10 in the closing state.
Figure 7:
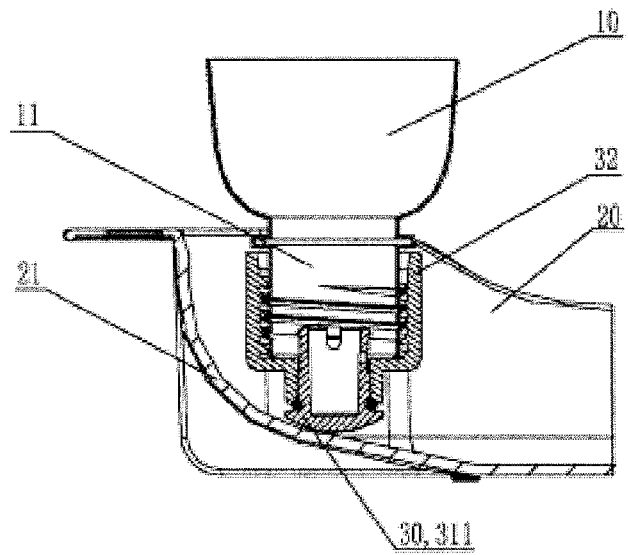
FIG. 7 is the partially sectional view on the case where the said water storage bottle 10 is rotated round the horizontal axis until it is perpendicular to the water tray 20.

As illustrated in in FIGS. 4, 9 and FIG. 13, it also comprises a connecting piece 32 which are hollow casing ones, the inner ring surface at its front end is set up a second step diameter 301 corresponding to the first step diameter 410 at the vertical surface of the said bottle stopper 30, the inner ring surface at its rear end is set with the inner screw thread adapted to the outer screw thread of the said water storage bottle mouth 11.

As illustrated in FIG. 10-13, The gap connected with the said water outlet 710 is formed between the surface of the concave area 510 at the vertical surface 310 of the said bottle stopper and the inner ring surface at the front end of the said connecting pieces 32, thus forming the said water flow path 810; the first step diameter 410 at the vertical surface 310 of the said bottle stopper detached from or mated with the second step diameter at the inner wall for the front ends of the said connecting piece 32, correspondingly, the said water flow path 810 is clear or sealed. As illustrated in FIG. 4, when the first step diameter 410 at the vertical surface 310 of the said bottle stopper mated with the second step diameter 301 at the inner wall for the front ends of the said connecting pieces 32, the part 411 at the lower section for the vertical surface 310 of the said bottle stopper completely fits the inner ring surface at the front ends of the said connecting pieces 32, and the said water flow path 810 is completely sealed; when the first step diameter 410 at the vertical surface 310 of the said bottle stopper detached from the second step diameter 301 at the inner wall for the front ends of the said connecting pieces 32, the part 411 at the lower section for the vertical surface 310 of the said bottle stopper completely detaches from the inner ring surface at the front ends of the said connecting pieces 32, and the said water flow path 810 is clear.

Preferentially, the said bottle stopper 30 and connecting piece 32 are made from engineering plastics difficult of the wear and tear.

Figure 8:
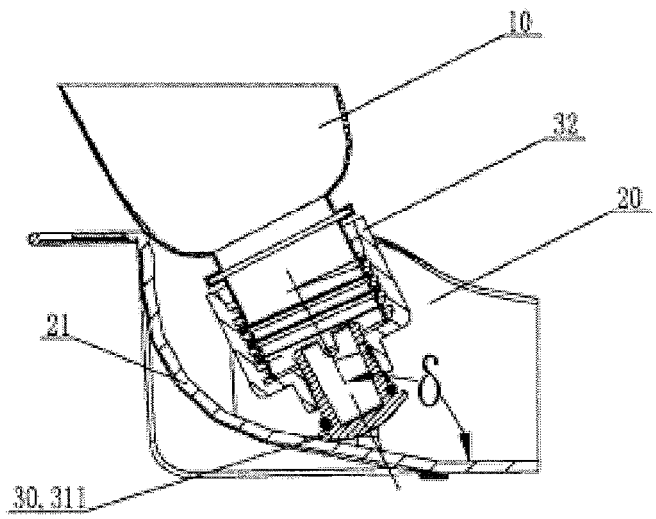
FIG. 8 is the partially sectional view for the water storage bottle 10 in use.
Figure 10:
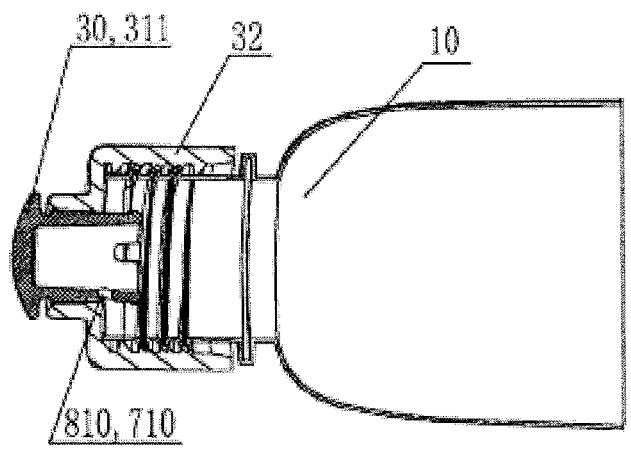
FIG. 10 is the partially sectional view on the case where the said bottle stopper 30 has moved into the said water storage bottle 10.

As illustrated in FIGS. 1 & 8, when the said water storage bottle 10 is in use, its central axis and the base of the said water tray 20 intersect at the obtuse angle δ, and 135°>δ>100°.

Figure 11:
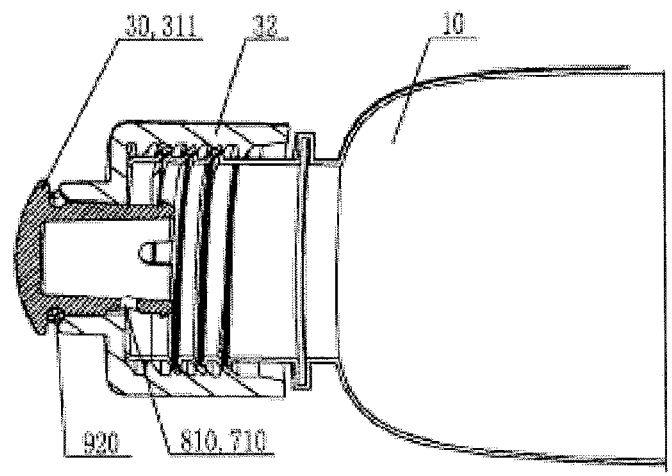
FIG. 11 is the partially sectional view on the case where the said sealing circle 920 is added to FIG. 10.
Figure 12:
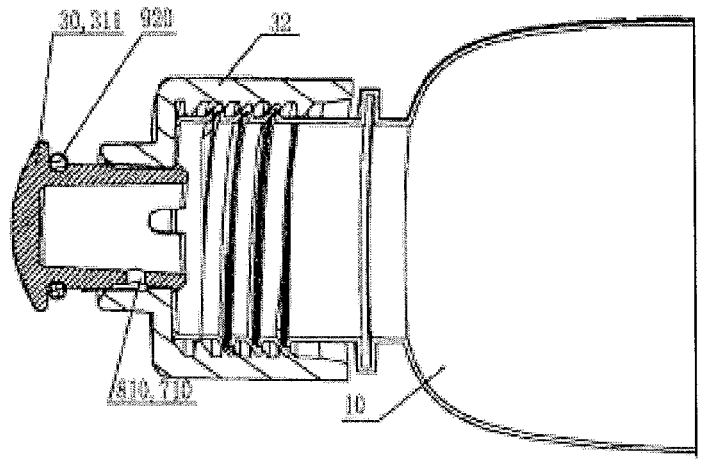
FIG. 12 is the partially sectional view on the case where the said bottle stopper 30 has moved a distance from the said water storage bottle 10.

As illustrated in FIGS. 4, 11 & 12, at the part linking the vertical surface 310 of the said bottle stopper and its head 311 is set with the ring-shaped concave slot 910 surrounding the said vertical surface 310, a sealing circle 920 is inlaid into such concave slot 910, which are used for further sealing the said water flow path 810.

Figure 5:
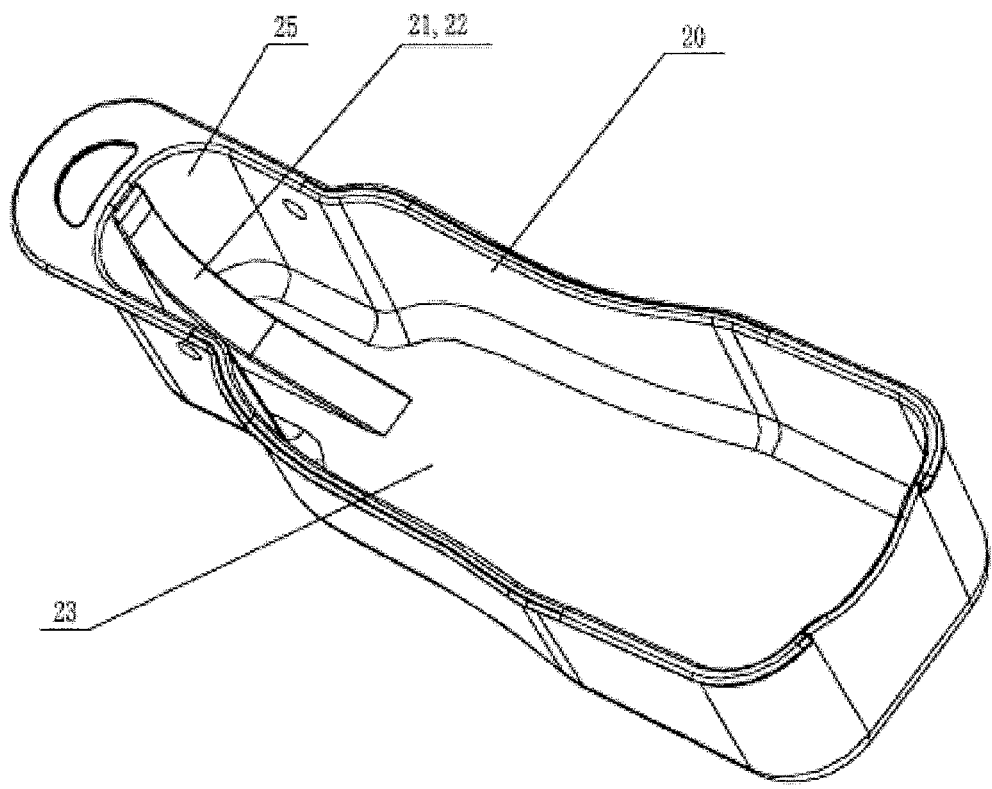
FIG. 5 is axonometric projection illustrative diagram on the overall appearance of the bottle stopper 20 as illustrated in FIG. 1.

As illustrated in FIG. 5, at the inner base of the said water tray 20 is set with the bulging structure 22 of the said curved sliding surface 21, such bulging structure 22 is set at one end of the said water tray 20 and connects the inner base 23 and one tip end 25 of the said water tray 20; the said curved sliding surface 21 is formed by its stretching downwards from the top of such tip end 25 to the inner base 23 of the said water tray 20.

As illustrated in FIG. 1, on the said connecting piece 32 are set with pivot 34, correspondingly, the said water tray 20 is set with shaft holes 24, the said water storage bottle 10 is rotated from the closing state to the using state through the joining of the pivot and shaft hole.

Figure 3:
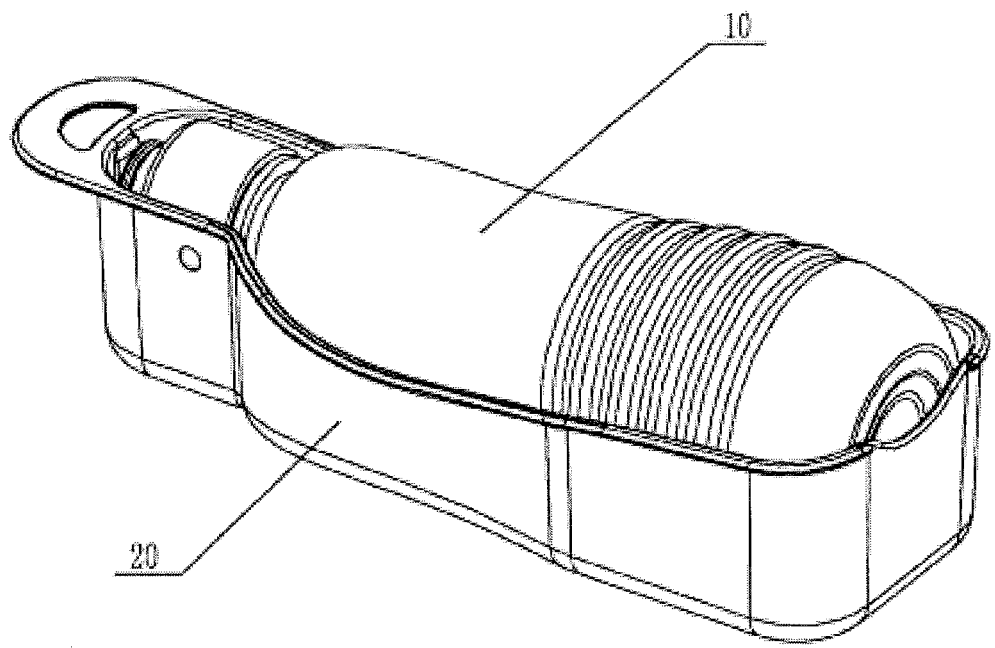
FIG. 3 is the axonometric projection illustrative diagram for the water storage bottle 10 in the closing state as illustrated in FIG. 1.

As illustrated in FIG. 3, the said water tray 20 partially surrounds the said water storage bottle 10.

What is claimed is:

1. A portable feeder for pets, comprising:
   a water storage bottle;
   a water tray, the water tray and the water storage bottle rotatably connected by a shaft hole in the water tray and a pivot on the water storage bottle;
   a bottle stopper and a curved sliding surface set on an inner base of the water tray, the curved sliding surface having a root at a top of the inner base, the bottle stopper having a hollow cylindrical shape with a middle section set with radial outlet holes for water flow out of the water storage bottle, the bottle stopper positioned in a water storage bottle mouth, which shares a central axis with the water storage bottle, a head of the bottle stopper configured to press against the root of the curved sliding surface to press the bottle stopper into the water storage bottle mouth and stop a flow of water from the water storage bottle when the water storage bottle is in a closed position in which the water storage bottle rests in the water tray;
   the head of the bottle stopper configured to move from the closed position against the root to a second position at an oblique surface at a bottom of the inner base when the water storage bottle is rotated about the pivot, wherein when the water storage bottle is rotated until perpendicular to the inner base of the water tray, the bottle stopper is still inside the water storage bottle mouth; wherein the water storage bottle is configured to move to an open position in which the central axis of the water storage bottle and the inner base of the water tray intersect at an obtuse angle of δ; wherein under pressure arising from the water storage bottle squeezed, the bottle stopper moves a distance along a bottle stopper axis towards an outside of the bottle mouth, a water flow path between the water storage bottle and the water tray is opened; and wherein when the water storage bottle ceases to be squeezed, water flow into the water tray is stopped.

2. The portable water feeder for pets as set forth in claim 1, wherein:
   the bottle stopper further comprises a hollow curved ring-shaped vertical surface and head with an arc protruding from an outer surface of the bottle stopper, the vertical surface including coaxial upper and lower sections having different diameters; the lower section is close to the head and having a larger diameter than that of the upper section, thus forming a first step diameter on vertical surface; one side of the bottle stopper including a frame-shaped concave area spanning the upper and lower sections of the vertical surface and having a narrow strip extending away from the lower section and configured to selectively cover a water outlet of the bottle stopper.

3. The portable water feeder for pets as set forth in claim 2, wherein the bottle stopper further comprises:
   a connecting piece configured to connect the bottle stopper to the water storage bottle with an inner screw thread adapted to an outer screw thread of the water storage bottle mouth; and
   wherein the bottle stopper, the water storage bottle and the connecting piece define a gap between the surface of the concave area and an inner ring surface at a front end of the connecting piece; the first step diameter of the bottle stopper detached from or mated with a second step diameter corresponding to the first step diameter at the inner wall ring surface.

4. The portable water feeder for pets as set forth in claim 3, wherein:
   the bottle stopper and the connecting piece are made from plastics that resist wear and tear.

5. The portable water feeder for pets as set forth in claim 1, wherein when the water storage bottle is in its open position, the central axis of the water storage bottle and the inner base of the water tray intersect at the obtuse angle δ, and 135°>δ>100°.

6. The portable water feeder for pets as set forth in claim 1, wherein:
   the bottle stopper includes, a sealing circle inlaid into the concave area, for the sealing circle configured to further seal the water flow path.

7. The portable water feeder for pets as set forth in claim 1, wherein the curved sliding surface connects the inner base and one end of the water tray, the curved sliding surface extending downwards from the one end to the inner base of the water tray.

* * * * *